United States Patent
Walker et al.

(10) Patent No.: US 6,324,520 B1
(45) Date of Patent: Nov. 27, 2001

(54) METHOD AND APPARATUS FOR COLLECTING AND APPLYING VENDING MACHINE DEMAND INFORMATION

(75) Inventors: Jay S. Walker, Ridgefield; Daniel E. Tedesco, New Canaan, both of CT (US); John M. Packes, Jr., Hawthorne, NY (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 09/164,670

(22) Filed: Oct. 1, 1998

Related U.S. Application Data

(63) Continuation-in-part of application No. 09/012,163, filed on Jan. 22, 1998, which is a continuation-in-part of application No. 08/947,798, filed on Oct. 9, 1997.

(51) Int. Cl.⁷ ..................................................... G06F 17/60
(52) U.S. Cl. .............................. 705/16; 705/28; 700/231; 700/232; 700/238; 700/244
(58) Field of Search ................................. 705/15, 16, 22, 705/28, 1; 221/2, 5, 8, 9; 700/231, 232, 236, 237, 244, 238, 233; 194/217

(56) References Cited

U.S. PATENT DOCUMENTS

| | | | |
|---|---|---|---|
| Re. 29,450 | 10/1977 | Goldsby et al. | 340/870.05 |
| 3,705,384 | 12/1972 | Wahlberg | 705/5 |
| 3,747,733 | 7/1973 | Knickerbocker | 194/346 |
| 4,258,837 | 3/1981 | Manos et al. | 194/219 |

(List continued on next page.)

FOREIGN PATENT DOCUMENTS

| | | | |
|---|---|---|---|
| 2 265 032 A * | 9/1993 | (GB) | G06F/15/24 |
| 7098779 | 4/1995 | (JP) | |
| 9190479 | 7/1997 | (JP) | |
| 8-147545 * | 6/1996 | (JP) | G06F/9/02 |
| WO9527242 | 10/1995 | (WO) | |
| WO 97/28510 * | 8/1997 | (WO) | |

OTHER PUBLICATIONS

Burke, Raymond R., "Virtual Shopping: Breakthrough in Marketing Research", Harvard Business Review, vol. 74, Issue 2, pp 120–131, Mar. 1996.*

"VendingMiser", Optimum Energy Group(http://www.optimumenergy.com/products/miser.html), download date: Aug. 12, 1998.

"Windows for Vending", Vendmaster (http://www.vendmaster.com/products_main.html), download date: Jul. 16, 1998.

"Windows for Vending PRO", Vendmaster (http://www.vendmaster.com/pro_main.html), download date: Jul. 16, 1998.

PCT International Search Report for Application No. PCT/US99/01089, dated May 11, 1999.

*Primary Examiner*—James P. Trammell
*Assistant Examiner*—John W. Hayes
(74) *Attorney, Agent, or Firm*—Dean P. Alderucci

(57) ABSTRACT

A dispensing device, such as a vending machine, is equipped to monitor product demand and consumer traffic that passes by the machine. The dispensing device collects and analyzes product demand data to determine optimal product stocking, to offer products to undecided consumers and to offer substitute products when a selected product is out of stock. The substitute product may be determined according to which alternate product historically has the highest demand when a particular selected product is unavailable. Alternatively, the substitute product may be determined according to which stocked item has an imminent expiration date. Also, the substitute product may be predetermined by an operator of a vending machine or may be determined by other factors. The substitute product may further be offered to the customer at a discounted price.

48 Claims, 10 Drawing Sheets

U.S. PATENT DOCUMENTS

| | | | |
|---|---|---|---|
| 4,282,575 | | 8/1981 | Hoskinson et al. .................. 700/238 |
| 4,316,532 | | 2/1982 | Levasseur ............................ 194/218 |
| 4,359,147 | * | 11/1982 | Levasseur ............................ 700/232 |
| 4,376,479 | | 3/1983 | Sugimoto et al. ................... 194/218 |
| 4,412,292 | * | 10/1983 | Sedam et al. ............................ 221/9 |
| 4,420,751 | * | 12/1983 | Paganini et al. ................ 340/825.33 |
| 4,478,353 | * | 10/1984 | Levasseur ............................. 221/14 |
| 4,498,570 | | 2/1985 | King et al. ........................... 194/217 |
| 4,574,947 | | 3/1986 | Hutchings ............................ 194/217 |
| 4,598,378 | | 7/1986 | Giacomo ............................... 700/236 |
| 4,639,875 | * | 1/1987 | Abraham et al. .................... 700/236 |
| 4,654,800 | * | 3/1987 | Hayashi et al. ...................... 700/236 |
| 4,679,150 | | 7/1987 | Hayashi et al. ...................... 700/238 |
| 4,736,096 | | 4/1988 | Ushikubo ........................ 235/462.49 |
| 4,834,231 | * | 5/1989 | Awane et al. ........................ 700/236 |
| 4,899,906 | | 2/1990 | Bella ....................................... 221/67 |
| 4,999,763 | | 3/1991 | Ousborne ............................. 700/236 |
| 5,029,098 | * | 7/1991 | Levasseur ............................ 700/231 |
| 5,091,713 | | 2/1992 | Horne et al. ......................... 700/241 |
| 5,117,407 | | 5/1992 | Vogel ..................................... 386/97 |
| 5,257,179 | | 10/1993 | DeMar .................................. 705/400 |
| 5,408,417 | | 4/1995 | Wilder ....................................... 705/5 |
| 5,504,675 | | 4/1996 | Cragun et al. .......................... 705/14 |
| 5,546,316 | * | 8/1996 | Buckley et al. ...................... 700/233 |
| 5,596,501 | | 1/1997 | Comer et al. ........................ 705/413 |
| 5,630,357 | * | 5/1997 | Akiyama .............................. 99/323.6 |
| 5,685,435 | | 11/1997 | Picioccio et al. .................... 209/677 |
| 5,687,087 | | 11/1997 | Taggart ................................. 700/233 |
| 5,768,142 | | 6/1998 | Jacobs .................................. 700/231 |
| 5,769,269 | | 6/1998 | Peters ....................................... 221/7 |
| 5,822,216 | * | 10/1998 | Satchell, Jr. et al. ................. 700/232 |
| 5,831,862 | | 11/1998 | Hetrick et al. ....................... 700/232 |
| 5,875,110 | * | 2/1999 | Jacobs .................................. 700/232 |
| 5,878,401 | | 3/1999 | Joseph .................................... 705/22 |
| 5,930,771 | * | 7/1999 | Stapp ...................................... 705/28 |
| 5,959,869 | * | 9/1999 | Miller et al. ......................... 700/231 |
| 5,963,452 | * | 10/1999 | Etoh et al. ........................... 700/236 |
| 5,988,346 | * | 11/1999 | Tedesco et al. ...................... 700/237 |
| 6,021,394 | * | 2/2000 | Takahashi .............................. 705/10 |
| 6,052,667 | * | 4/2000 | Walker et al. ......................... 705/15 |

* cited by examiner

| OPERATOR IDENTIFIER 201 | AUTHORIZATION CODE 203 |
|---|---|
| AB 22D | AC1B2 |
| 2C A43 | BCA22 |
| BA 1C4 | AB2C1 |
| 3B A22 | CCA3B |
| AA 32B | BA1A3 |

FIG. 2

| PRODUCT IDENTIFIER 301 | SUGGESTIVE SELL FILE LOCATION 303 | SUGGESTIVE SELL CONTENT 305 | SUGGESTIVE SELL PRICE 307 | SUGGESTIVE SELL CRITERION 309 | SUBSTITUTE PRODUCT IDENTIFIER 311 | SUGGESTIVE SELLS OFFERED 312 | SUGGESTIVE SELLS ACCEPTED 314 |
|---|---|---|---|---|---|---|---|
| A1 | C:\\SS_A1 | "BUY NOW AND SAVE 25 CENTS ON A1 COLA" | $0.50 | AVG. DEMAND < 6 / 24 HOURS | B3 | 5 | 5 |
| A2 | C:\\SS_A2 | "WHY NOT TRY PETE'S PRETZELS FOR ONLY 50 CENTS" | $0.50 | AVG. DEMAND = 0 / 24 HOURS | B2 | 6 | 2 |
| A3 | C:\\SS_A3 | "TRY THE DELICIOUS COOKIES IN A3" | $0.65 | AVG. DEMAND < 1 / 12 HOURS | B1 | 4 | 3 |
| B1 | C:\\SS_B1 | "NOTHING BEATS WHAT'S IN B1" | $0.60 | AVG. DEMAND < 2 / 24 HOURS | A3 | 1 | 0 |
| B2 | C:\\SS_B2 | "TRY CHIP'S CHIPS AND SAVE 30 CENTS" | $0.45 | AVG. DEMAND < 2 / 24 HOURS | A2 | 0 | 0 |
| B3 | C:\\SS_B3 | "ENJOY A GRAPE SODA FOR ONLY 55 CENTS" | $0.55 | AVG. DEMAND < 1 / 12 HOURS | A1 | 5 | 4 |

FIG. 3

| PRODUCT IDENTIFIER 401 | ORIGINAL INVENTORY 403 | CURRENT INVENTORY 405 | PRICE 407 | STOCK DATE 409 | RESTOCK DATE 411 | PRODUCT EXPIRATION DATE 413 |
|---|---|---|---|---|---|---|
| A1 | 25 | 11 | $0.75 | 9/12/98 | 9/15/98 | 9/30/98 |
| A2 | 16 | 12 | $0.75 | 9/12/98 | 9/15/98 | 9/16/98 |
| A3 | 15 | 7 | $0.85 | 9/12/98 | 9/15/98 | 9/20/98 |
| B1 | 18 | 14 | $0.80 | 9/12/98 | 9/15/98 | 9/20/98 |
| B2 | 14 | 0 | $0.75 | 9/12/98 | 9/15/98 | 9/20/98 |
| B3 | 25 | 23 | $0.75 | 9/12/98 | 9/15/98 | 9/30/98 |

FIG. 4

| PRODUCT IDENTIFIER 501 | AVERAGE TIME FOR RECEIPT OF CREDITS (SEC.) 502 | AVERAGE SELECTION TIME (SEC.) 503 | CURRENT AVERAGE DEMAND RATE 505 |
|---|---|---|---|
| A1 | 2.2 | 3.9 | 7 / 24 HOURS |
| A2 | 2.2 | 6.2 | 1 / 12 HOURS |
| A3 | 2.2 | 5.1 | 2 / 12 HOURS |
| B1 | 2.2 | 5.5 | 2 / 24 HOURS |
| B2 | 2.2 | 2.6 | 7 / 24 HOURS |
| B3 | 2.2 | 4.4 | 1 / 24 HOURS |

FIG. 5

| PRODUCT IDENTIFIER 601 | PRODUCT SELECTION 603 | AVERAGE SALE PRICE 605 |
|---|---|---|
| A1 | 14 | $0.75 |
| A2 | 4 | $0.75 |
| A3 | 8 | $0.85 |
| B1 | 4 | $0.80 |
| B2 | 21 | $0.75 |
| B3 | 2 | $0.66 |

113

FIG. 6 ns and the implementations of those decisions are not
METHOD AND APPARATUS FOR COLLECTING AND APPLYING VENDING MACHINE DEMAND INFORMATION The present application is a continuation-in-part of co-pending U.S. patent application Ser. No. 09/012,163 entitled "METHOD AND APPARATUS FOR AUTOMATICALLY VENDING A COMBINATION OF PRODUCTS" filed on Jan. 22, 1998 in the name of Daniel E. Tedesco, James A. Jorasch, Jay S. Walker and Robert R. Lech which is a continuation-in-part of co-pending U.S. patent application Ser. No. 08/947,798 entitled "METHOD AND APPARATUS FOR DYNAMICALLY MANAGING VENDING MACHINE INVENTORY PRICES" filed on Oct. 9, 1997 in the name of Daniel E. Tedesco, James A. Jorasch and Robert R. Lech, both of which are incorporated herein by reference and assigned to the assignee of the present invention.

FIELD OF THE INVENTION

This invention relates generally to dispensing devices and relates more specifically to a dispensing device, such as a vending machine, that monitors and uses product demand and inventory information to increase product sales.

BACKGROUND OF THE INVENTION

Vending machines are well known and have existed since the late 1880s. The first vending machines were rudimentary devices primarily designed to dispense cigarettes and postcards. Modern vending machines are employed to store and dispense a vast array of merchandise and/or offer various services in response to a customer request accompanied by appropriate payment. Examples of merchandise dispensed by such machines include drinks, candy, frozen deserts, snacks, video tapes and children's toys. Examples of services offered include automated car washes, portrait photographs, laundry machines, television viewing and blood pressure monitoring.

Many entrepreneurs are attracted to the basic concept of selling products and services using a vending machine. Vending machines are generally considered to have significant advantages over traditional merchandising. Specifically, vending machines enable the automated sale of merchandise and services at unconventional locations and times, and they do not require sales personnel.

Although the basic advantages of vending machines are significant, prior art vending machines have several significant disadvantages when compared to traditional merchandising, particularly relating to inventory control and pricing. A first disadvantage is the difficulty of maintaining an inventory of perishable items. A second disadvantage is the difficulty of selling or "turning over" an inventory of low demand items and services or items with inferior quality. Although some vending machine suppliers offer to buy back inventory from operators who no longer want to sell certain products, such suppliers often fail to live up to their offer when an operator tries to exercise this option.

There have been many attempts at addressing the inventory problems of vending machines, including methods for determining what products and services are the most popular, what are the appropriate times to re-stock vending machine items and in what quantities. The solutions include methods and systems that enable vending machine operators to remotely monitor inventory and remotely retrieve sales data. Other solutions have been proposed in the forms of accounting software and bar code readers that detect the expiration dates of vending machine items. Further solutions are disclosed in commonly-owned, co-pending U.S. patent application Ser. No. 09/012,163 entitled "METHOD AND APPARATUS FOR AUTOMATICALLY VENDING A COMBINATION OF PRODUCTS" filed on Jan. 22, 1998 in the name of Daniel E. Tedesco, James A. Jorasch, Jay S. Walker and Robert R. Lech and commonly-owned, co-pending U.S. patent application Ser. No. 08/947,798 entitled "METHOD AND APPARATUS FOR DYNAMICALLY MANAGING VENDING MACHINE INVENTORY PRICES" filed on Oct. 9, 1997 in the name of Daniel E. Tedesco, James A. Jorasch and Robert R. Lech, both of which are incorporated herein by reference.

Examples of vending machine patent prior art that attempt to solve the problems identified above include: U.S. Pat. No. 4,412,292, entitled "System for the Remote Monitoring of Vending Machines;" U.S. Pat. No. 4,654,800, entitled "Control and Monitoring Apparatus for Vending Machines;" U.S. Pat. No. 5,091,713, entitled "Inventory, Cash, Security, and Maintenance Control Apparatus and Method for a Plurality of Remote Vending Machines;" U.S. Pat. No. 5,367,452, entitled "Mobile Merchandising Business Management System which Provides Comprehensive Support Services for Transportable Business Operations;" and U.S. Pat. No. 4,282,575, entitled "Control and Monitoring Apparatus for Vending Machines." These inventions generally disclose remote monitoring systems, currency control systems, and data collection systems designed to address shortcomings of prior art vending devices.

Non-patent prior art includes VendMaster's software product entitled "Windows for Vending PRO with Inventory." This product enables a vending machine operator to report and analyze various historical sales data. VendMaster's product is intended to enhance a vending machine operator's ability to identify high-demand inventory, determine preferable times to stock the machine and calculate suggested prices.

These solutions fail to adequately address certain shortcomings of present vending machines. Specifically, the prior art fails to provide adequate solutions to the problem of satisfying customer demand when a desired product or service is unavailable. Using the prior art solutions, an operator may use collected supply and demand data to help determine suitable alternate products, but the fact that operators must manually ratify and implement the decisions renders these solutions burdensome, inaccurate and inefficient. These solutions are inefficient because human decisions and the implementations of those decisions are not dynamically responsive to real-time market pressures. They are delayed until the operator analyzes supply and demand data, arrives at a decision, and adjusts the machine accordingly.

A need therefore exists for a method and apparatus that monitors demand of a vending machine inventory and that dynamically and automatically determines substitute products or services to offer in order to increase a vending machine's profitability.

Accordingly, the shortcomings associated with the related art have heretofore not been adequately addressed. The present invention addresses such problems by providing methods and apparatus that have not previously been proposed.

SUMMARY OF THE INVENTION

The present invention provides a method and apparatus for monitoring sales and determining substitute products and/or services to offer when a selected product and/or service is unavailable. According to a first aspect of the present invention, a method and apparatus is disclosed for dispensing a substitute product by receiving a selection of a first product from a purchaser. If the first product is not available, a substitute product identifier corresponding to a substitute product is retrieved and the substitute product is offered to the purchaser.

According to a second aspect of the present invention, a method and apparatus is disclosed for dispensing a substitute product by measuring a demand for each of a plurality of products and, in turn, determining from the demand a substitute product for a first product. A substitute product identifier corresponding to the substitute product is stored for the first product.

According to a third aspect of the present invention, a method and apparatus is disclosed for dispensing a substitute product by determining an average selection time. After a purchaser is detected, a time from the detection of the purchaser is measured. If the time is greater than or equal to the average selection time, a first product is offered to the purchaser.

According to a fourth aspect of the present invention, a method and apparatus is disclosed for measuring a demand of an unavailable product offered by a dispensing device by receiving a selection of a product and determining the availability of the product. If the product is unavailable, an indication that the selected product is unavailable is stored.

Further embodiments and advantages of the present invention will become apparent from the following detailed description when read in conjunction with the accompanying drawings.

BRIEF DESCRIPTION OF THE DRAWINGS

FIG. 2 is a block diagram illustrating the operator authorization database used by the dispensing device of FIG. 1.

FIG. 3 is a block diagram illustrating the transaction database used by the dispensing device of FIG. 1.

FIG. 4 is a block diagram illustrating the suggestive sell database used by the dispensing device of FIG. 1.

FIG. 5 is a block diagram illustrating the inventory database used by the dispensing device of FIG. 1.

FIG. 6 is a block diagram illustrating the demand database used by the dispensing device of FIG. 1.

DETAILED DESCRIPTION OF THE PREFERRED EMBODIMENTS

Definitions:

The following terms as used herein will be understood to have the following meanings:

Dispensing device: Any device or machine capable of receiving an amount of money and outputting one or more products.

Product: An item or a service sold through a dispensing device.

Substitute product: A product offered in place of a selected product.

Predetermined product: A product which an operator of the dispensing device has set as a default substitute product.

Product identifier: A designation that is recognized by the dispensing device and that corresponds to a product.

Predefined criterion: A requirement accessible by the dispensing device, by which the dispensing device determines which of a plurality of products is a substitute product.

Expiration date: A date on which a product is no longer suitable for use or consumption.

Availability: A determination as to whether a product is able to be dispensed.

Amount of money: A monetary value, such as cash, credit, or electronic cash transferred to a dispensing device.

Discounted price: A price to purchase a product which is less than the price originally displayed by the dispensing device.

Purchaser: One who wishes to purchase a product from a dispensing device.

Selection: An input entered into the dispensing device by the purchaser to indicate a product the purchaser desires to purchase.

Average selection time: An amount of time measured by the dispensing device which is based on an average measured time between one of (1) a detection of a purchaser and a receipt of an amount of money from the purchaser, (2) a detection of a purchaser and a receipt of a selection from the purchaser, and (3) a receipt of an amount of money from the purchaser and a receipt of a selection from the purchaser.

Demand: A measurement of the number of times the product was selected for purchase.

Suggestive sell: An offer, made by the dispensing device, to sell a product when either no product has yet been selected by a purchaser or an unavailable product has been selected by a purchaser.

Figure 1:
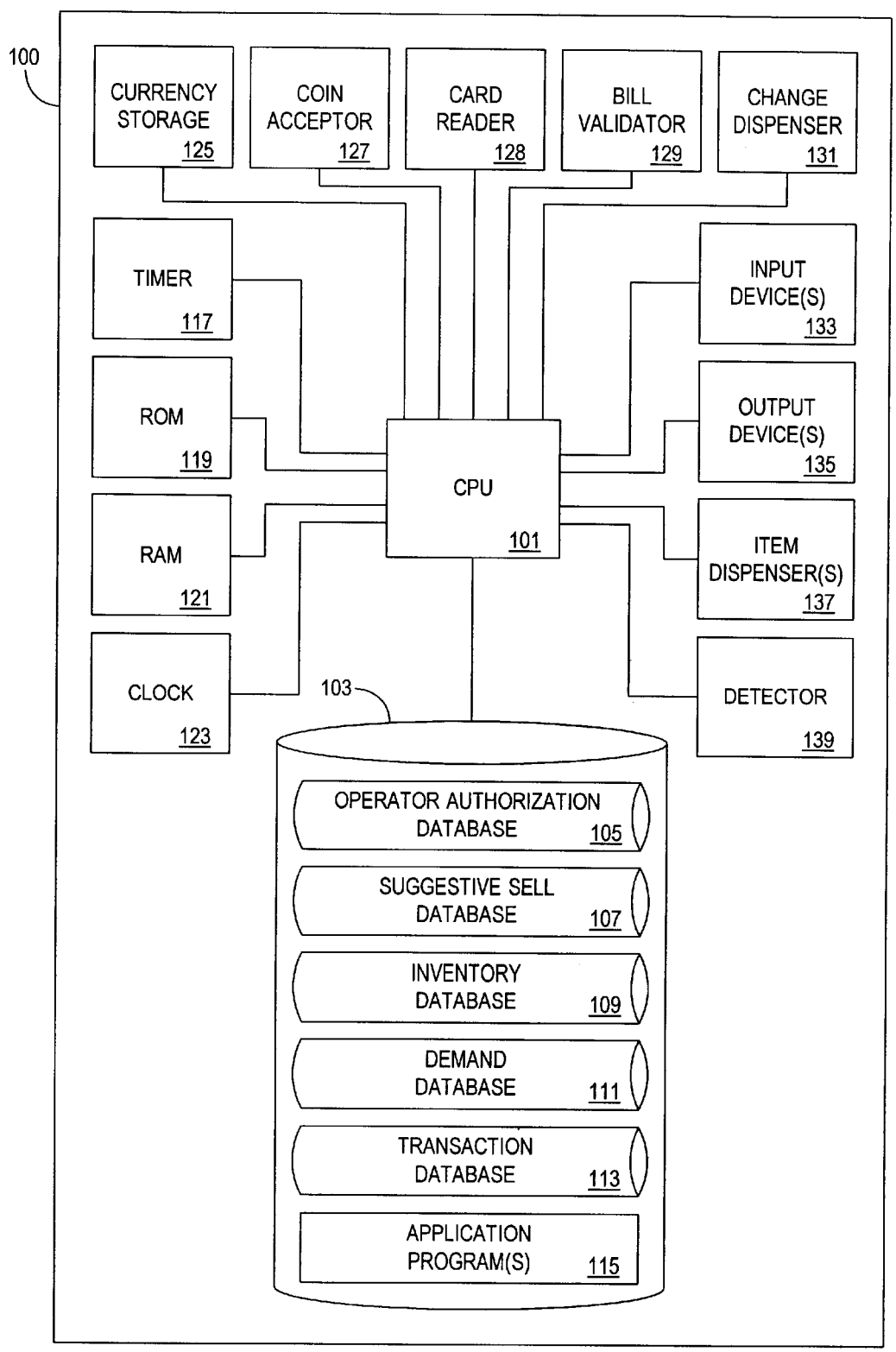
FIG. 1. is a schematic block diagram of a dispensing device of the instant invention.

The present invention will now be discussed with reference to FIGS. 1–8C. FIG. 1 displays a schematic block diagram of dispensing device 100 and its components. Dispensing device 100 may be a vending machine, kiosk or any other mechanism by which a purchaser may purchase goods or services in exchange for a deposit of an amount of money. Dispensing device 100 is controlled by central processing unit (CPU) 101 which may be may be any commonly manufactured microprocessor chip, such as the Pentium II® manufactured by Intel® Corporation. Central processing unit (CPU) 101 runs at a clock speed determined by clock 123, which is operatively connected to CPU 101.

Central processing unit (CPU) 101 is further operatively connected to standard computer components such as random access memory (RAM) 121, read-only memory (ROM) 119, input device(s) 133, output device(s) 135 and data storage device 103. Random access memory (RAM) 121 may be one or more single inline memory module (SIMM) chips capable of storing a predetermined amount of data (typically measured in megabytes) and used by central processing unit (CPU) 101 for temporary storage of processing instructions during operation of dispensing device 100. Read-only memory (ROM) 119 is at least one permanent non-erasable and non-rewritable memory chip that stores initializing instructions to be used by central processing unit (CPU) 101 during a start-up routine performed by dispensing device 100. Further functions of random access memory (RAM) 121 and read-only memory (ROM) 119 will be apparent to one of ordinary skill in the art.

Input device(s) 133 may be one or more of the following commonly known peripherals used for inputting data to a dispensing device: a parallel port, a serial port, a keypad, a push button, a voice recognition device, and the like. Input device(s) 133 preferably contain an external input device for use by a purchaser and a separate internal input device, accessible only by a servicer or operator of dispensing device 100 after the device has been opened. In this manner, a purchaser enters his or her selections for products through the external input device, and a servicer may access and update data stored by dispensing device 100 through the internal input device.

Output device(s) 135 may be one or more of the following commonly known peripherals used for outputting data from a microprocessor: a parallel or serial port, a printer, a monitor, an LED or LCD display, a voice synthesizer, and/or a combination of any of these devices. Output device(s) 135 preferably contain an external output device for displaying or broadcasting messages to a purchaser and a separate internal output device, accessible only by a servicer or operator of dispensing device 100 after the device has been opened. In this manner, a servicer may receive data stored by dispensing device 100 through the internal output device. Further applicable output devices will be apparent to one of ordinary skill in the art. Additionally, input device(s) 133 and output device(s) 135 may be one device, such as a communications port that can both receive and transmit data.

CPU 101 is operatively connected to transmit and receive data from data storage device 103, which may be any one of the following commonly known peripherals used for storing computer data: a hard drive, a floppy disk drive, a DVD drive of the type manufactured by Philips Electronics, a ZIP drive of the type manufactured by IOMEGA, a tape drive and a Digital Audio Tape drive. Further such devices will be apparent to one of ordinary skill in the art. Data storage device 103 is operative to store operator authorization database 105, suggestive sell database 107, inventory database 109, demand database 111, and transaction database 113, each of which is discussed below with reference to FIGS. 2–6, respectively. Data storage device 103 is further operative to store an operating system (not shown) and one or more application programs 115. In accordance with a preferred embodiment of the present invention, the application program(s) 115 contain processing instructions for central processing unit (CPU) 101 to retrieve and perform the operator verification process shown in FIG. 7, and the demand monitoring and suggestive sell functions of FIGS. 8A–8C, each of which is discussed in detail below.

Central processing unit (CPU) 101 is further operatively connected to timer 117 which can be set, reset and read by central processing unit (CPU) 101 to measure the passage of time. Alternatively, central processing unit (CPU) 101 may use signals generated by clock 123 to measure the passage of time in place of timer 117, as will be apparent to one of ordinary skill in the art.

Central processing unit (CPU) 101 is further operatively connected to monitor and operate currency storage 125, coin acceptor 127, card reader 128, bill validator 129, change dispenser 131, item dispenser(s) 137, and detector 139. Currency storage 125 is equipped to store both physical currency and electronic forms of currency, such as e-cash or credits from a debit card, credit card or smart card, received by dispensing device 100. Coin acceptor 127 accepts and determines an amount of money received from coinage deposited into dispensing device 100. Card reader 128 receives electronic currency from a card, such as a smart card, debit card or credit card and/or determines account information for an account owned by the card owner. The account information is stored and used to apply a charge against the account for a product selected and dispensed by dispensing device 100. Bill validator 129 accepts and determines an amount of money received from monetary bills deposited into dispensing device 100.

Change dispenser 131 dispenses any change that is due to a purchaser who deposits money into coin acceptor 127, card reader 128, or bill validator 129. The amount of change to be dispensed is determined by central processing unit (CPU) 101 by using one of the application program(s) 105. In a process not shown, but apparent to one of ordinary skill in the art, central processing unit (CPU) 101 determines an amount of money that a purchaser has deposited, recognizes a product that the purchaser has selected and calculates the difference between the amount of money deposited and the amount to be charged for the product. The difference is dispensed to the purchaser through change dispenser 131. Change dispenser 131 may be operatively connected to currency storage 125 (not shown) to dispense change from that device.

Detector 139 is a device that sends a signal to central processing unit (CPU) 101 when a purchaser is detected near dispensing device 100. Detector 139 is used by dispensing device 100 to initiate the demand monitoring and suggestive sell functions discussed further below with regard to FIGS. 8A–8C. Detector 139 may be any of the following types of devices: a motion detector, an infrared detector, an acoustic signal detector, a pressure detector mounted on the floor in front of dispensing device 100 or any other device that may detect a presence of a purchaser when he or she is in proximity of dispensing device 100 and which outputs a signal indicative of the presence of the purchaser.

Referring now to FIG. 2, operator authorization database 105 stores operator identifiers and corresponding authorization codes which are required to be entered in order to access data stored in dispensing device 100. Each record in operator authorization database 105 contains an entry in operator identifier field 201 and authorization code field 203. Operator identifier field 201 preferably lists several codes, each of which are assigned to a particular operator or servicer authorized to access data stored by dispensing device 100. Each such code in operator identifier field 201 has a corresponding unique authorization code stored in authorization code field 203. Upon accessing dispensing device 100, an operator must enter, through input device(s) 133, a valid operator identifier code and the authorization code assigned to that identifier. Upon entry of the information, central processing unit (CPU) 101 refers to operator authorization database 105 and confirms that the entered information matches a record in operator authorization database 105. As discussed further with regard to FIG. 7, if the information matches, the operator is allowed to access and update data stored in data storage device 103 of dispensing device 100. If the information does not match, the operator is denied access to the machine.

Figure 8A:
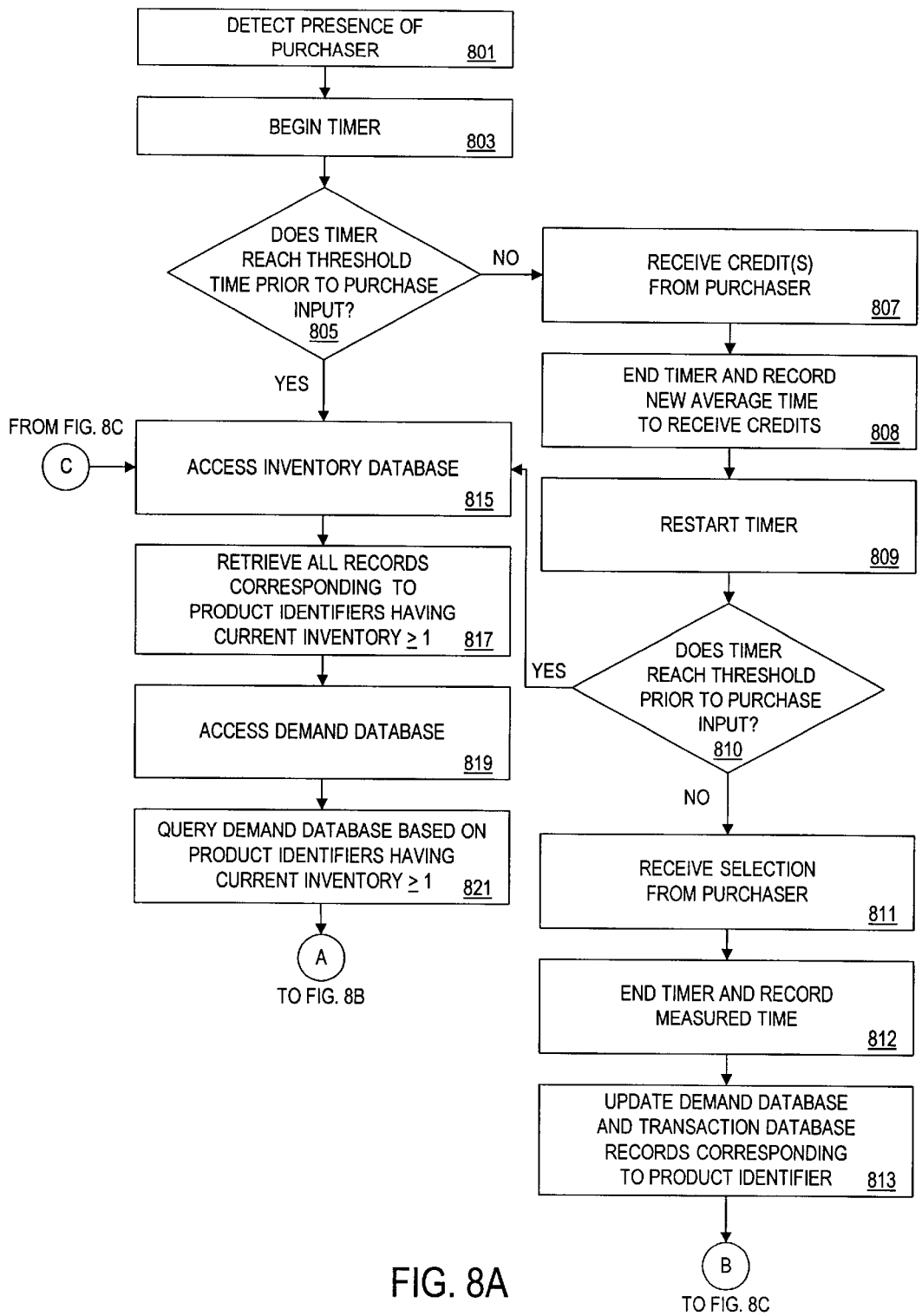
FIGS. 8A–8C are flow charts illustrating the demand monitoring and suggestive sale functions performed by the dispensing device of FIG. 1.
Figure 8B:
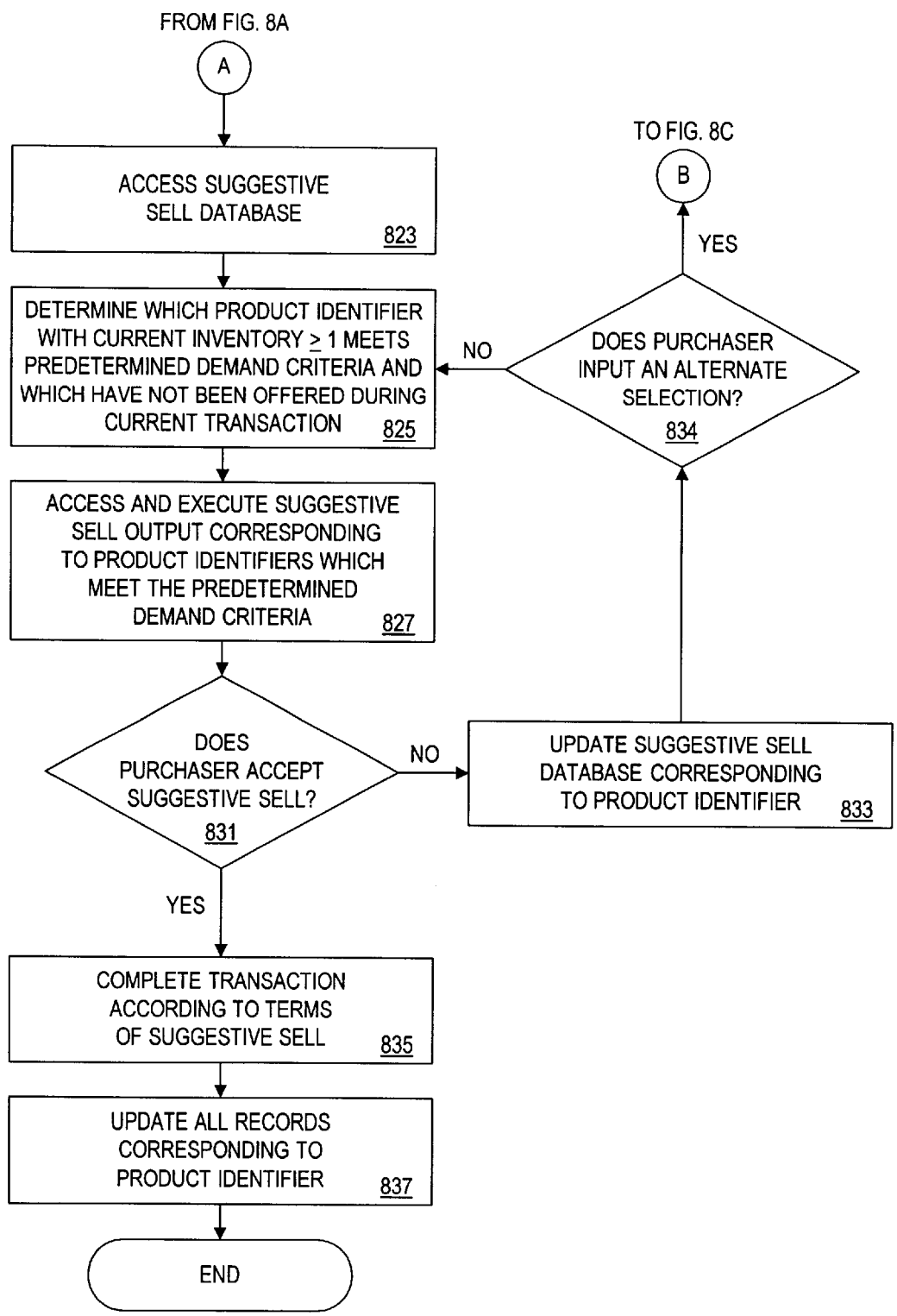
Figure 8C:
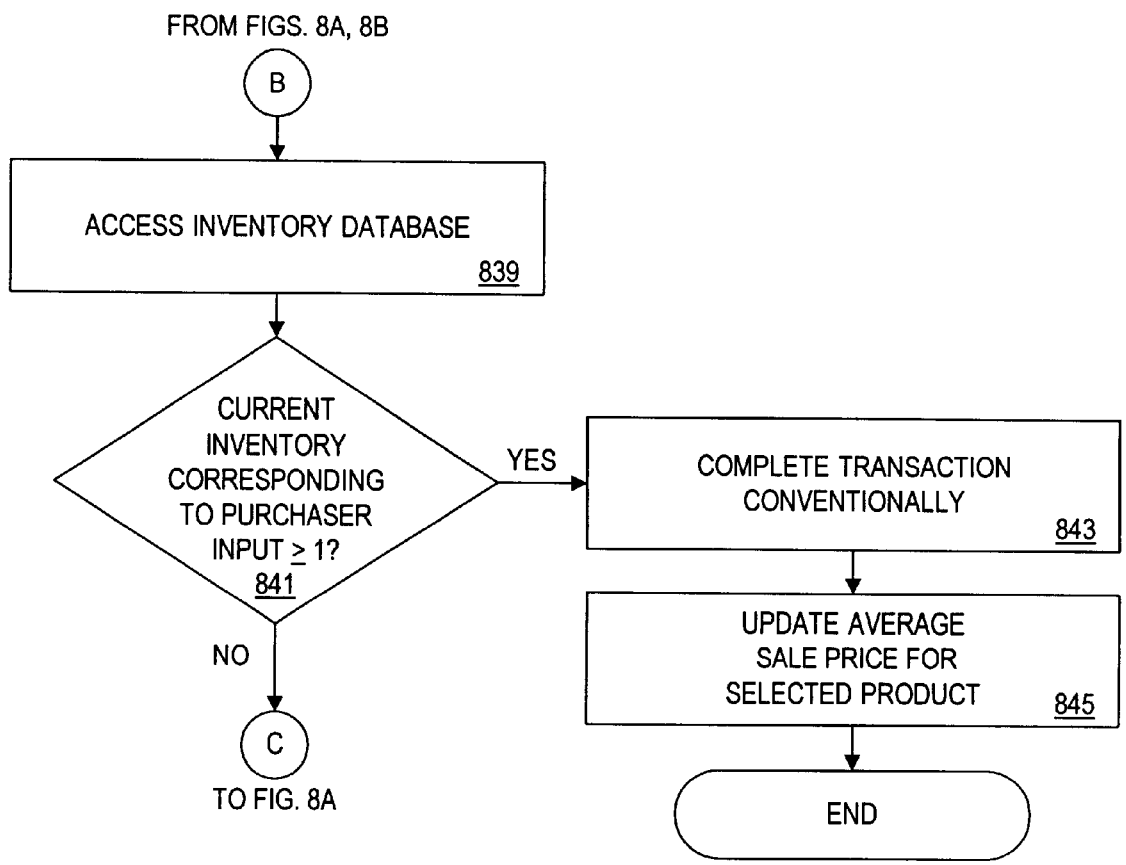

FIG. 3 displays the exemplary contents of suggestive sell database 107 which is maintained by dispensing device 100 for implementing the suggestive sale functions performed, as described further with regard to FIGS. 8A–8C. Each record of suggestive sell database 107 contains an entry in product identifier field 301, suggestive sell file location field 303, suggestive sell content field 305, suggestive sell price field 307, suggestive sell criterion field 309, substitute product identifier field 311, suggestive sells offered field 312 and suggestive sells accepted field 314.

Preferably, each entry in product identifier field 301 corresponds to one product offered by dispensing device 100. A unique product identifier is assigned to each type of product or, alternatively may correspond to a rack or shelf (not shown) in dispensing device 100 on which the product is stored and/or displayed. For each product identifier, an entry of a suggestive sell file is made in suggestive sell file location field 303. The suggestive sell file location is preferably an address of a data file stored in storage device 103. The data file may contain audio or textual information that is output to a purchaser during the suggestive sell functions described further in conjunction with FIGS. 8A–8C. The audio and textual information is preferably a description of a suggestive sell being offered to a purchaser during a transaction.

For each product identifier, an entry is also made in suggestive sell content field 305. The suggestive sell content lists the text or audio message stored at the location stored in suggestive sell file location field 303. The information in this field preferably corresponds to the audio or textual information that is to be presented to a purchaser during the suggestive sell functions performed by dispensing device 100, discussed further in conjunction with FIGS. 8A–8C.

For each product identifier, an entry is also made in suggestive sell price field 307. The suggestive sell price is a discounted price, preferably determined by an operator of dispensing device 100, for which a product will be offered during the suggestive sell function discussed further in conjunction with FIGS. 8A–8C.

For each product identifier, an entry is also made in suggestive sell criterion field 309. The suggestive sell criterion is preferably defined and entered by an operator of dispensing device 100. The suggestive sell criterion may be a requirement that the average demand for a product associated with the criterion is below a certain average demand rate. Additional and/or alternate suggestive sell criteria may be included as will be apparent to one of ordinary skill in the art. In any event, if the suggestive sell criterion is met, the product associated with the criterion is eligible to be offered in the suggestive sell function described in conjunction with FIGS. 8A–8C.

For each product identifier entered in product identifier field 301, a substitute product identifier is entered in substitute product identifier field 311. The substitute product identifier is meant to identify a product to be offered when an initial product selection is not available. For example, referring to record 320 of FIG. 3, if product A1 is selected by a purchaser and is not available, then the machine will offer product B3 as a suggestive sell.

The substitute product to be offered may be operator-selected or may be determined by the dispensing device 100 after an analysis of demand data has been performed. For example, CPU 101 may be programmed to track and store which product is most often selected after an initially selected product is identified as being unavailable. In one embodiment, a product identifier corresponding to the most often alternately-selected product may then be stored as a substitute product in substitute product identifier field 311. Other criteria may be employed in programming the device to determine a substitute product. These criteria may include: which product has been stocked most recently (as may be determined by examining stock date field 409); which product is due to be restocked at the earliest date (as may be determined from restock date field 411); or which product will expire at the earliest date (as may be determined from product expiration date field 413). Other criteria may be employed in making the determination as to which product will act as a substitute product, as will be apparent to one of ordinary skill in the art.

Preferably, a substitute product identifier is listed for each product identifier in product identifier field 301. The substitute product identifier, furthermore, preferably corresponds to an existing product which is already listed in product identifier field 301. Hence, any product in substitute product field is preferably listed in product identifier field 301. However, for each record in suggestive sell database 107 the value listed in product identifier field 301 should not be the same product identifier listed in substitute product identifier field 311.

Suggestive sells offered field 312 of suggestive sell database 107 lists the number of times a product corresponding to the product identifier was offered in a suggestive sell. Suggestive sells accepted field 314 lists the number of times the product was accepted as a suggestive sell. This information is measured and recorded during the suggestive sell functions described in accordance with FIG. 8B. The information in these fields is useful to an operator of dispensing device 100, or to the dispensing device itself, to determine the effectiveness of a suggestive sell for each of the products. For example, in the case where a product is offered through a suggestive sell many times, but is rarely accepted, the operator or dispensing device 100 may adjust the terms of the suggestive sell offered so that the acceptance rate increases. This may be accomplished, for example, by decreasing the suggestive sell price for the product, or by determining a suitable substitute product and changing the substitute product identifier of field 311. Methods for allowing a dispensing device 100 to determine suitable substitute products and/or adjust suggestive sell prices are discussed further in co-pending U.S. patent application Ser. No. 08/947,798 entitled "METHOD AND APPARATUS FOR DYNAMICALLY MANAGING VENDING MACHINE INVENTORY PRICES" filed on Oct. 9, 1997 in the name of Daniel E. Tedesco, James A. Jorasch and Robert R. Lech and co-pending U.S. patent application Ser. No. 09/012,163 entitled "METHOD AND APPARATUS FOR AUTOMATICALLY VENDING A COMBINATION OF PRODUCTS" filed on Jan. 22, 1998 in the name of Daniel E. Tedesco, James A. Jorasch, Jay S. Walker and Robert R. Lech, both incorporated herein by reference.

FIG. 4 displays the preferred contents of inventory database 109. For each record in inventory database 109, an entry is stored in product identifier field 401, original inventory field 403, current inventory field 405, price field 407, stock date field 409, restock date field 411 and product expiration date field 413.

Preferably, each entry in product identifier field 401 corresponds to one product offered by dispensing device 100. Furthermore, the entries in product identifier field 401 may correspond to the entries made in product identifier field 301 of suggestive sell database 107. Each identifier listed in product identifier field 401 is preferably a unique identifier that corresponds to a single product offered by the machine. As described above, the product identifier may correspond to a rack or shelf (not shown) in dispensing device 100 on which the product is stored and/or displayed.

For each product identifier in product identifier field 401, an entry is made in original inventory field 403 that represents the number of the product originally placed for dispensing in dispensing device 100. Current inventory field 405 contains an entry, preferably maintained by dispensing device 100, corresponding to the amount of the product remaining in dispensing device 100. Price field 407 contains an entry, for each product, representing the original, nondiscounted price at which the product is offered for purchase. Stock date field 409 lists, for each product, the date on which the product was placed in the dispensing device 100. Restock date field 411 lists, for each product, a date on which the product is expected to be re-stocked by an operator of dispensing device 100. Finally, product expiration date field 413 lists, for each product, a date on which the product is no longer suitable for use or consumption.

FIG. 5 displays demand database 111 which contains database records having a product identifier field 501, average time for receipt of credits field 502, average selection time field 503 and current average demand rate field 505. Preferably, each entry product identifier field 501 corresponds to one product offered by dispensing device 100. Furthermore, the entries in product identifier field 501 may correspond to the entries made in product identifier field 301 of suggestive sell database 107. Each product identifier listed in product identifier field 501 is preferably a unique identifier that corresponds to a single type of product offered by the machine. Alternately, as described above, the product identifier may correspond to a rack or shelf (not shown) in dispensing device 100 on which the type of product is stored and/or displayed.

Average time for receipt of credits field 502 lists, for each product, an average amount of time taken by purchasers to input an amount of credits after detection of the customer by detector 139 of dispensing device 100. This information is used by dispensing device 100 to determine a time after which to offer a suggestive sell, as discussed further in regard to FIGS. 8A–8C.

Average selection time field 503 lists, for each product, an average amount of time taken by purchasers to select the corresponding product. The amount of time may be measured from either the initial detection of a purchaser or from an input of credits by the purchaser. This information is used by dispensing device 100 to determine a time after which to offer a suggestive sell, as discussed further in regard to FIGS. 8A–8C.

Current average demand rate field 505 lists, for each product, a current rate of demand for the corresponding product. The demand rate for a product is preferably determined by measuring the number of times the product was selected over an amount of time, i.e. 12 selections of the product every 24 hours. This information is used by dispensing device 100 to determine a time after which to offer a suggestive sell, as discussed further in regard to FIGS. 8A–8C.

FIG. 6 displays the contents of transaction database 113 which contains database records having a product identifier field 601, a product selection field 603 and an average sale price field 605. Preferably, each entry in product identifier field 601 corresponds to one type of product offered by dispensing device 100. Furthermore, the entries in product identifier field 601 may correspond to the entries made in product identifier field 301 of suggestive sell database 107. Each identifier listed in product identifier field 601 is preferably a unique identifier that corresponds to a single type of product offered by the machine. As described above, the product identifier may correspond to a rack or shelf (not shown) in dispensing device 100 on which the product is stored and/or displayed.

Product selection field 603 lists, for each product, a number of times the product was selected by a purchaser. Average sale price field 605 lists, for each product, the average sale price for which a corresponding product was sold. The average sale price is determined, preferably, by counting the number of times a product was sold and at what price (either the original price or suggestive sell price) the product was sold in each instance. The average sale price may then be determined by calculating the sum of the sale prices and dividing by the number of product sales. Other methods will be apparent to one of ordinary skill in the art. The average sale price field contains data which may be useful to the operator of dispensing device 100 in determining the profitability of each product sold. The information in average sale price field 605 is updated during the demand monitoring and suggestive sell functions described in conjunction with FIGS. 8A–8C below.

Figure 7:
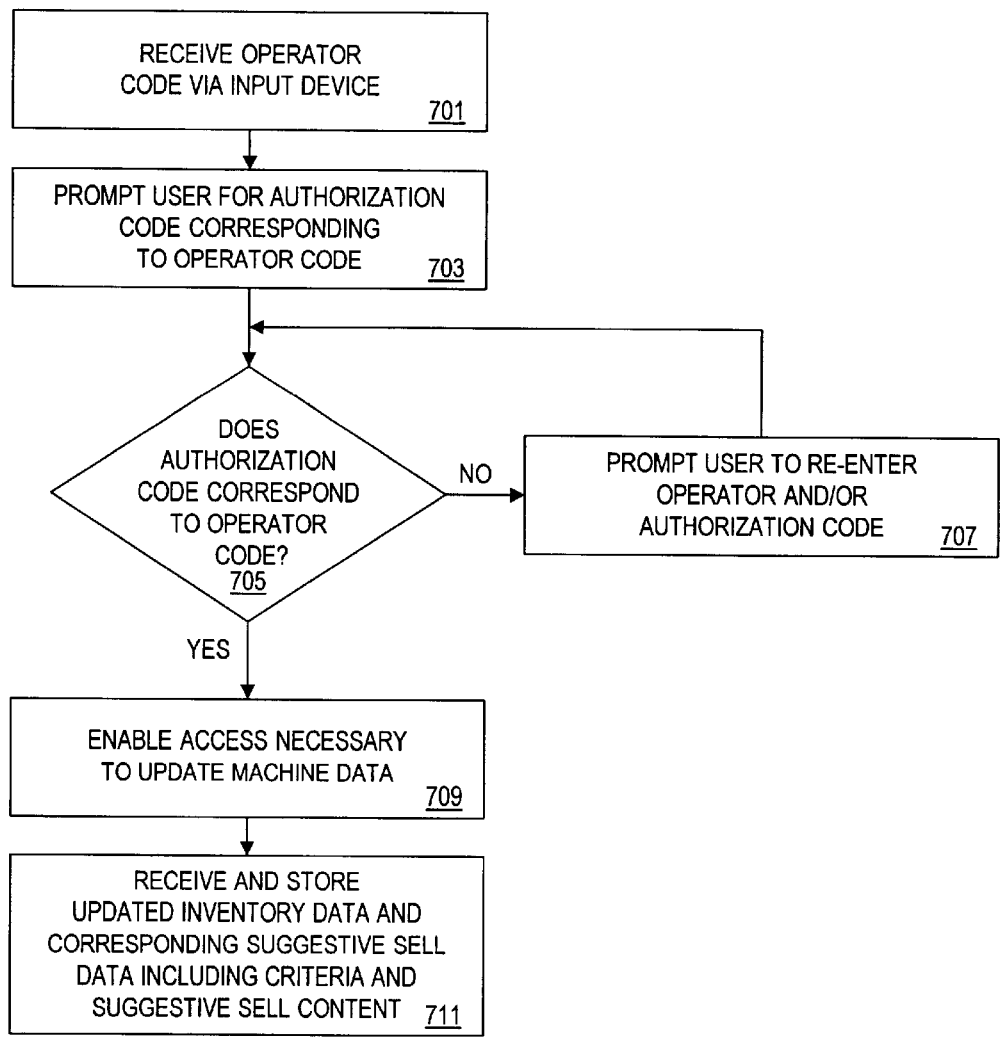
FIG. 7 is a flow chart illustrating a process by which an operator can access demand data stored by the dispensing device of FIG. 1.

Turning now to FIG. 7, a process by which an operator can access and update data stored by the dispensing device 100 is displayed. This process is preferably performed by central processing unit (CPU) 101 in conjunction with at least one of the application program(s) 115.

To perform the accessing process, an operator preferably gains access to the internal components of dispensing device 100. The operator, through input device(s) 133 inputs commands to CPU 101 that initiates the accessing process. At step 701, the operator inputs an operator code via input device(s) 133. The operator code is read by CPU 101. At step 703, the CPU 101 prompts the operator, through output device(s) 135, to enter the corresponding authorization code. At step 705, after the operator has input the authorization code, CPU 101 accesses operator authorization database 105 and confirms that the operator identifier code and authorization code are valid. If the codes are both valid, the process continues on to step 709, discussed below. If the codes are not valid, the process proceeds to step 707 where the operator is prompted to re-enter the correct codes. Steps 701, 703, 705, and 707 may be repeated any number of times until the correct codes are entered, or may be terminated after a predetermined number of times.

After an entry of a correct operator code and a correct corresponding authorization code, the process continues to step 709 where the operator is allowed to transmit data through input device(s) 133 and receive data through output device(s) 135 from storage device 103. At step 711, CPU 101 receives any updated inventory data and corresponding suggestive sell data. CPU 101 stores the received inventory data in inventory database 109 and stores any received suggestive sell data in suggestive sell database 107. For example, any received suggestive sell criterion data will be stored in suggestive sell criterion field 309 and any received suggestive sell content data will be stored in suggestive sell content field 305. The received data is stored in the appropriate database fields as will be apparent to one of ordinary skill in the art. After step 711, the accessing process ends.

Turning now to FIG. 8A, the process by which CPU 101 performs demand monitoring and suggestive sale functions begins at step 801 where detector 139 sends a signal to CPU 101 indicating that a purchaser is present in front of dispensing device 100. At step 803, CPU 101 measures the time beginning from the detection of the customer. This may be accomplished by sending a start signal to timer 117 or by measuring the time using clock 123 as discussed previously with regard to FIG. 1. At step 805, CPU 101 measures the amount of time passed since the purchaser was detected and compares it to an average time stored, for example, in average time for receipt of credits field 502. If the measured time reaches the average time stored in field 502, the process continues at step 815. Otherwise the process continues at step 807.

At step 807, dispensing device 100 receives a number of credits from the purchaser. At step 808, CPU 101 stops measuring the time passed since detection, determines a new average time for receipt of credits from a purchaser using the latest measured time and stores the value in field 502. At step 809, CPU 101 preferably starts a new measurement of time starting from the receipt of credits from the purchaser. This may be accomplished by sending a start signal to timer 117 or by measuring the time using clock 123 as discussed previously with regard to FIG. 1. At step 810, CPU 101 measures the amount of time passed since the purchaser has input credits and compares it to the average times stored in average selection time field 503. The time passed since the purchaser has input credits may be measured from the time a first credit (such as a coin) has been deposited in either coin dispenser 127, card reader 128 or bill validator 129.

Since, in the preferred embodiment, different average selection times are stored for each product, CPU 101 determines a threshold time by comparing the measured time to one of: the lowest average selection time stored in average selection time field 503, the highest average selection time stored in average selection time field 503 or an average of the average selection times stored in average selection time field 503. If the measured time reaches the threshold time, the process continues at step 815, discussed further below. Otherwise the process continues at step 811.

At step 811, a selection of a product is made by the purchaser. At step 812, CPU 101 stops measuring the time passed since the purchaser input credits, determines a new average time selection time for the product selected by the purchaser based on the latest measured time and stores the value in field 502 for the record corresponding to the selected product. At step 813, CPU 101 updates the new current average demand rate in field 505 and increments the product selection field 603 of transaction database 113 for the product identifier corresponding to the selected product. The process then continues on to step 839, discussed further below in conjunction with FIG. 8C below.

If previously at step 805 the threshold time has been reached, the process continues at step 815 where CPU 101 accesses inventory database 109. At step 817, CPU 101 searches current inventory field 405 of inventory database 109 for all product identifiers having a current inventory greater than or equal to one. At step 819, CPU 101 then accesses demand database 111. At step 821, CPU 101 determines, from current average demand field 505 of demand database 111, the current average demand rate for each product identifier having a current inventory greater than or equal to one. The process then continues at step 823.

Referring now to FIG. 8B, at step 823, CPU 101 next accesses suggestive sell database 107. At step 825, CPU 101 determines, for the product identifier or identifiers having a current inventory greater than one, which product demand data meets the criteria listed in suggestive sell criterion field 309 of database 107. CPU 101 then determines which of these product identifiers have not already been selected by or suggested to the purchaser during the present transaction. This may be accomplished, for example, by tracking which products have been offered during the present transaction, and storing the tracking information temporarily in either data storage device 103 or random access memory 121.

CPU 101 next determines which of the remaining product identifier(s) to offer to the purchaser as a suggestive sell. In the case where more than one product identifier remains after all the above criteria have been applied, CPU 101 may analyze further criteria to determine which product to offer as a suggestive sell. For example, CPU 101 may be programmed to determine which of the remaining products has the highest overall demand rate (as can be readily determined by comparing the values in current average demand rate field 505) and use that product in the subsequent steps relating to a suggestive sell. Alternatively, CPU 101 may be programmed to select the remaining product with the lowest overall demand rate in an effort to sell products with weak demand. Furthermore, CPU 101 may simply select a substitute product listed in substitute product identifier field 311, if a purchaser has already selected a product which is out of stock or otherwise unavailable. Further criteria include which product has been stocked most recently (as may be determined by comparing the values stored in stock date field 409), which product is due to be restocked earlier (as may be determined from restock date field 411) or which product will expire earlier (as may be determined from product expiration date field 413). Other criteria may be employed in making the determination as to which product to offer in a suggestive sell, as will be apparent to one of ordinary skill in the art.

After a product identifier has been determined in step 825, the process continues at step 827 where CPU 101 determines the suggestive sell file location corresponding to that product identifier by accessing suggestive sell file location field 303. The information in the file is then displayed or broadcast to the purchaser, as discussed above with regard to FIG. 3. Also as discussed, the information may correspond to the data listed in suggestive sell content field 305. Furthermore, the product to be offered through a suggestive sell may be offered at the suggestive sell price listed in suggestive sell price field 307.

At step 831, CPU 101 determines whether the purchaser accepts the suggestive sell. This may be determined by ascertaining whether the purchaser has input the selection corresponding to the product identifier offered in the suggestive sell. If the suggestive sell is accepted, the process continues to step 835, discussed below. Otherwise, the process continues to step 833.

At step 833, CPU 101 increments the record in suggestive sell offered field 312 corresponding to the product identifier offered during the suggestive sell. At step 834, CPU 101 determines whether the purchaser inputs an alternate selection. If so, the process continues to step 839, discussed below in conjunction with FIG. 8C. If not, the process returns to step 825, discussed above, and can be repeated any number of times until there are no further products which have not been offered to the purchaser.

At step 835, after the purchaser accepts the product that is offered through the suggestive sell, CPU 101 completes the transaction by, for example, dispensing the product to the customer and dispensing any change due through change dispenser 131. At step 837, CPU 101 updates all records corresponding to the product identifier that are affected by the transaction. The updates preferably include: incrementing suggestive sell offered field 312, incrementing suggestive sell accepted field 314, decrementing current inventory field 405, updating current average demand rate field 505, incrementing product selection field 603 and updating average price field 605 by recalculating the average price by including the price for which the product was sold according to the suggestive sell. After step 837, the demand monitoring and suggestive sell functions end.

Referring now to FIG. 8C, from either step 813 or step 834, the process continues at step 839 where CPU 101 accesses inventory database 109. At step 841, CPU 101 determines the current inventory for a selected product by retrieving the appropriate value stored in current inventory field 405. CPU 101 then determines whether the current inventory for the product selected by the purchaser is at least one, thereby determining whether any of the selected product remains in dispensing device 100. If the current inventory of the selected product is zero, the process returns to step 815. Otherwise the process continues on to step 843 wherein the transaction is completed. This is accomplished, for example, when dispensing device 100 dispenses the selected product to the customer and dispenses any change due through change dispenser 131.

Next, at step 845, the average sale price for the product identifier corresponding to the selected product is updated according to the sales data from the current transaction. The new average sale price is determined and stored in average sale price field 605, after which the process ends.

While the best mode contemplated for carrying out the invention has been described in detail in the foregoing, those of ordinary skill in the art to which the instant invention relates will recognize various alternative designs and embodiments for practicing the invention. For example, the database structures described above and in the figures may be rearranged, fields may be added or deleted, or the databases may be consolidated. Furthermore, though a stand-alone dispensing device has been described in the preferred embodiment, it is contemplated that the dispensing machine may be a networked device with the ability to store data either locally or at an alternate, networked location. Such alternative embodiments are contemplated to be within the scope of the instant invention. Accordingly, it is to be understood that the foregoing description is provided for illustrative purposes only and does not limit the scope of the instant invention, as defined by the appended claims.

We claim:

1. A computerized method of dispensing a substitute product from a vending machine that includes a processor, comprising:
   detecting a purchaser;
   receiving an amount of money from the purchaser;
   measuring a time between a detection and a receipt of the amount of money from the purchaser;
   storing a value corresponding to the time;
   receiving at the processor a selection of a first product from the purchaser; and if the first product is not available,
      retrieving a substitute product identifier corresponding to a substitute product;
   offering the substitute product to the purchaser; and
   dispensing the substitute product.

2. The method of claim 1, wherein the detecting step is performed by at least one of:
   a motion detector, an infrared detector, an acoustic signal detector, and a pressure detector.

3. A computerized method of dispensing a substitute product from a vending machine that includes a processor, comprising:
   receiving an amount of money from a purchaser;
   receiving at the processor a selection of a first product from the purchaser;
   measuring a time between a receipt of the amount of money and a receipt of the selection;
   storing a value corresponding to the time; and
   if the first product is not available,
      retrieving a substitute product identifier corresponding to a substitute product;
      offering the substitute product to the purchaser; and
      dispensing the substitute product.

4. A computerized method of dispensing a substitute product from a vending machine that includes a processor, comprising:
   measuring a second product demand corresponding to a number of times a second product is selected when a first product is unavailable;
   if the second product demand meets a predefined criterion,
      storing a second product identifier corresponding to the second product as a substitute product identifier for the first product;
   receiving at the processor a selection of the first product from a processor; and
   if the first product is not available,
      retrieving the substitute product identifier corresponding to the second product;
      offering the second product to the purchaser; and
      dispensing the second product.

5. The method of claim 4, further comprising:
   measuring a third product demand corresponding to a number of times a third product is selected when the first product is unavailable.

6. The method of claim 5, wherein the predefined criterion comprises a requirement that the second product demand is higher than the third product demand.

7. A computerized method of dispensing a substitute product from a vending machine that includes a processor, comprising:
   storing a first expiration date corresponding to a second product;
   storing a second expiration date corresponding to a third product;
   determining whether the first expiration date is earlier than the second expiration date, and if the first expiration date is earlier:
      storing a second product identifier corresponding to the second product as a substitute product identifier for a first product;
   receiving at the processor a selection of the first product from a purchaser;
   if the first product is not available,
      retrieving the substitute product identifier corresponding to the second product;
      offering the second product to the purchaser; and
      dispensing the second product.

8. A computerized method of dispensing a substitute product from a vending machine that includes a processor, comprising:
   measuring a demand for each of a plurality of products stored in the vending machine;
   storing, for a first product, a substitute product identifier corresponding to a substitute product;
   receiving at the processor a selection of the first product from a purchaser;
   if the first product is not available,
      retrieving the substitute product identifier;
      offering the substitute product to the purchaser; and
      dispensing the substitute product;
   wherein the offering step further comprises:
      determining a second product demand for the second product, and if the second product demand is higher than the demand for each of the plurality of products:
         storing a second product identifier corresponding to a second product as the substitute product identifier.

9. A computerized method of dispensing a substitute product from a vending machine that includes a processor, comprising:

detecting a purchaser;

receiving at the processor a selection of a first product from the purchaser;

measuring a time between a detection of the purchaser and a receipt of the selection from the purchaser;

storing a value corresponding to the time; and if the first product is not available,
retrieving a substitute product identifier corresponding to a substitute product;
offering the substitute product to the purchaser; and
dispensing the substitute product.

10. The method of claim 9, wherein the detecting step is performed by at least one of:

a motion detector, an infrared detector, an acoustic signal detector, and a pressure detector.

11. A computerized method of dispensing a substitute product from a vending machine that includes a processor, comprising:

measuring an average selection time;

receiving at the processor a selection of a first product from a purchaser; and if the first product is not available,
retrieving a substitute product identifier corresponding to a substitute product;
offering the substitute product to the purchaser; and
dispensing the substitute product.

12. The method of claim 11, further comprising:

measuring a demand for each of a plurality of products stored in the dispensing device.

13. The method of claim 12, further comprising:

determining which of the plurality of products has a highest demand.

14. The method of claim 13, further comprising:

detecting the purchaser;

measuring a time that passes after detecting the purchaser; and if, prior to the receiving step, the time is greater than the average selection time,
offering the first product to the purchaser.

15. The method of claim 14, wherein the detecting step is performed by at least one of:

a motion detector, an infrared detector, an acoustic signal detector, and a pressure detector.

16. The method of claim 14, wherein the step of offering the first product to the purchaser further comprises:

offering the first product to the purchaser at a discounted price.

17. The method of claim 14, wherein the first product has the highest demand.

18. The method of claim 14, wherein the first product has the lowest demand.

19. The method of claim 14, further comprising:

comparing at least a first product expiration date corresponding to the first product and a second product expiration date corresponding to a second product.

20. The method of claim 19, wherein the step of offering the first product to the purchaser further comprises:

offering the first product to the purchaser if the first product expiration date is earlier than the second product expiration date.

21. A computerized method of dispensing a substitute product from a vending machine that includes a data storage device, comprising:

measuring a demand for each of a plurality of products;

determining from the demand a substitute product for a first product;

storing in the data storage device, for the first product, a substitute product identifier corresponding to the substitute product;

detecting a purchaser;

measuring a time between a detection of the purchaser and a receipt of an amount of money from the purchaser;

storing a value corresponding to the measured time; and dispensing the substitute product.

22. The method of claim 21, wherein the detecting step is performed by at least one of:

a motion detector, an infrared detector, an acoustic signal detector, and a pressure detector.

23. A computerized method of dispensing a substitute product from a vending machine that includes a data storage device, comprising:

measuring a demand for each of a plurality of products;

determining from the demand a substitute product for a first product;

storing in the data storage device, for the first product, a substitute product identifier corresponding to the substitute product;

detecting a purchaser;

measuring a time between a detection of the purchaser and a receipt of a selection from the purchaser;

storing a value corresponding to the measured time; and dispensing the substitute product.

24. The method of claim 23, wherein the detecting step is performed by at least one of:

a motion detector, an infrared detector, an acoustic signal detector, and a pressure detector.

25. A computerized method of dispensing a substitute product from a vending machine that includes a data storage device, comprising:

measuring a demand for each of a plurality of products;

determining from the demand a substitute product for a first product;

storing in the data storage device, for the first product, a substitute product identifier corresponding to the substitute product;

determining an average selection time; and dispensing the substitute product.

26. The method of claim 25, further comprising: determining which of the plurality of products has a highest demand.

27. The method of claim 26, further comprising:

detecting a purchaser;

measuring a time that passes after a detection of the purchaser; and if, prior to the step of receiving a selection, the time is greater than the average selection time,
offering the first product to the purchaser.

28. The method of claim 27, wherein the detecting step is performed by at least one of:

a motion detector, an infrared detector, an acoustic signal detector, and a pressure detector.

29. The method of claim 27, wherein the first product has the highest demand.

30. The method of claim 27, further comprising:

retrieving at least a first product expiration date corresponding to the first product and a second product expiration date corresponding to the second product.

31. The method of claim 30, wherein the offering step further comprises:
determining whether the first product expiration date is earlier than the second product expiration date, and if the first product expiration date is earlier, offering the first product to the purchaser.

32. The method of claim 25, further comprising:
determining which of the plurality of products has the lowest demand.

33. The method of claim 32, further comprising:
detecting a purchaser;
measuring a time that passes after a detection of the purchaser; and
if, prior to the step of receiving a selection, the time is greater than the average selection time,
offering the first product to the purchaser.

34. The method of claim 33, wherein the detecting step is performed by at least one of:
a motion detector, an infrared detector, an acoustic signal detector, and a pressure detector.

35. The method of claim 32, wherein the first product has the lowest demand.

36. The method of claim 35, wherein the offering step further comprises:
offering the first product to the purchaser at a discounted price.

37. A computerized method for dispensing a product from a vending machine that includes a detector device, comprising:
determining an average selection time;
detecting a purchaser by means of the detector device;
measuring a time from a detection of the purchaser; and
if the time is greater than the average selection time, offering a first product to the purchaser; and
dispensing the first product.

38. The method of claim 37, wherein the detecting step is performed by at least one of:
a motion detector, an infrared detector, an acoustic signal detector, and a pressure detector.

39. The method of claim 37, further comprising:
measuring a first product demand corresponding to the first product; and
measuring a demand for each of a plurality of remaining products; and
comparing the first product demand to the demand for each of the plurality of remaining products.

40. The method of claim 39, wherein the offering step further comprises:
offering the first product to the purchaser if the first product demand is greater than the demand for each of the plurality of remaining products.

41. The method of claim 39, wherein the offering step further comprises:
offering the first product to the purchaser if the first product demand is lower than the demand for each of the plurality of remaining products.

42. The method of claim 37, further comprising:
storing a first product expiration date corresponding to the first product; and
storing at least one expiration date corresponding to each of a plurality of remaining products.

43. The method of claim 42, further comprising:
offering the first product to the purchaser if the first product expiration date is earlier than the at least one expiration date.

44. The method of claim 37, wherein the first product is a predetermined product.

45. The method of claim 37, wherein the first product is a service.

46. An apparatus for dispensing a product, comprising:
means for determining an average selection time;
means for detecting a purchaser;
means for measuring a time from a detection of the purchaser;
means for offering a first product to the purchaser when the time is greater than the average selection time; and
means for dispensing the first product.

47. An apparatus for dispensing a product, comprising:
a storage device; and
a processor connected to the storage device,
the storage device storing a program for controlling the processor; and the processor operative with the program to:
determine an average selection time;
detect a purchaser;
measure a time from a detection of the purchaser; and
if the time is greater than the average selection time,
offer a first product to the purchaser; and
dispense the first product.

48. An article of manufacture comprising:
a computer usable medium having computer readable program code means embodied therein for causing a computerized vending machine to dispense a product, the computer readable program code means in said article of manufacture comprising:
computer readable program code means for determining an average selection time;
computer readable program code means for detecting a purchaser;
computer readable program code means for measuring a time from a detection of the purchaser; and
computer readable program code means for, if the time is greater than the average selection time,
offering a first product to the purchaser; and
dispensing the first product.

* * * * *